United States Patent
Robinson et al.

(10) Patent No.: US 11,030,567 B1
(45) Date of Patent: Jun. 8, 2021

(54) IDENTIFICATION AND ASSOCIATION OF REFRIGERATED CONTAINERS WITH DISPATCH ORDERS

(71) Applicant: STARTRAK INFORMATION TECHNOLOGIES, LLC, Rochelle Park, NJ (US)

(72) Inventors: Thomas A. Robinson, Mendham, NJ (US); Venkateswaran Karuppanan, Morris Plains, NJ (US); Timothy P. Slifkin, Morristown, NJ (US)

(73) Assignee: STARTRAK INFORMATION TECHNOLOGIES, LLC, Rochelle Park, NJ (US)

( * ) Notice: Subject to any disclaimer, the term of this patent is extended or adjusted under 35 U.S.C. 154(b) by 1721 days.

(21) Appl. No.: 14/503,051

(22) Filed: Sep. 30, 2014

Related U.S. Application Data (60) Division of application No. 12/693,435, filed on Jan. 25, 2010, now Pat. No. 8,849,723, which is a continuation of application No. 11/971,757, filed on Jan. 9, 2008, now abandoned.

(60) Provisional application No. 60/884,363, filed on Jan. 10, 2007, provisional application No. 60/884,183, filed on Jan. 9, 2007.

(51) Int. Cl.
  *G06Q 10/08* (2012.01)
  *H04B 7/26* (2006.01)

(52) U.S. Cl.
  CPC .......... *G06Q 10/0832* (2013.01); *H04B 7/26* (2013.01)

(58) Field of Classification Search
  CPC .............................. G06Q 10/0832; H04B 7/26
  See application file for complete search history.

(56) References Cited

U.S. PATENT DOCUMENTS

| | | | |
|---|---|---|---|
| 5,038,283 | A | 8/1991 | Caveney |
| 5,319,711 | A | 6/1994 | Servi |
| 5,424,720 | A | 6/1995 | Kirkpatrick |
| 5,917,433 | A | 6/1999 | Keillor et al. |
| 5,973,610 | A | 10/1999 | Jensen et al. |
| 5,977,647 | A | 11/1999 | Lenz et al. |

(Continued)

OTHER PUBLICATIONS

Joseph Tario. Electric-Powered Trailer Refrigeration Unit Market Study . . . Shurepower, LLC. Jun. 24, 2005. www.nyserda.ny.gov//media/Files /Publications /Research/Transportation/electric-powered-trailer-refrigeration.pdf. (Year: 2005).*

*Primary Examiner* — Daniel Vetter
*Assistant Examiner* — Manal A. Alsamiri
(74) *Attorney, Agent, or Firm* — Faegre Drinker Biddle & Reath LLP (57) ABSTRACT

A database sends identification and dispatch orders to a ship or rail transport that powers a shipping container during the ship or rail segment of the container's journey. The database also sends identification and dispatch orders to gensets that power shipping containers on a motor vehicle transport during a vehicular segment of the container's journey. The database associates the identification and dispatch orders along with the container as the container moves from connection with a genset on a vehicular transport to a ship or rail transport, and associates the identification and dispatch orders along with the container as the container moves to connection with a genset on a vehicular transport from a ship or rail transport.

6 Claims, 6 Drawing Sheets

(56) References Cited

U.S. PATENT DOCUMENTS

| | | | |
|---|---|---|---|
| 6,148,291 A | 11/2000 | Radican | |
| 6,429,810 B1 | 8/2002 | De Roche | |
| 6,631,310 B1 * | 10/2003 | Leslie | H02P 9/00 700/21 |
| 6,863,222 B2 | 3/2005 | Slifkin et al. | |
| 6,975,224 B2 | 12/2005 | Galley, III et al. | |
| 6,982,656 B1 * | 1/2006 | Coppinger | G06Q 10/08 340/426.19 |
| 7,135,976 B2 | 11/2006 | Neff et al. | |
| 7,196,622 B2 | 3/2007 | Lambright et al. | |
| 7,339,469 B2 | 3/2008 | Braun | |
| 7,455,225 B1 | 11/2008 | Hadfield et al. | |
| 7,545,266 B2 | 6/2009 | Brosius | |
| 7,827,119 B2 * | 11/2010 | Bjerre | G06Q 10/0834 705/333 |
| 2002/0099567 A1 | 7/2002 | Joao | |
| 2004/0066328 A1 | 4/2004 | Galley et al. | |
| 2004/0100379 A1 | 5/2004 | Boman et al. | |
| 2004/0148052 A1 | 7/2004 | Ferguson et al. | |
| 2004/0233041 A1 * | 11/2004 | Bohman | G08B 13/14 340/10.1 |
| 2005/0156736 A1 | 7/2005 | Rajapakse et al. | |
| 2005/0216294 A1 * | 9/2005 | Labow | G06Q 10/08 705/333 |
| 2005/0248454 A1 | 11/2005 | Hanson et al. | |
| 2006/0109106 A1 | 5/2006 | Braun | |
| 2006/0164239 A1 | 7/2006 | Loda | |
| 2006/0200560 A1 | 9/2006 | Waugh et al. | |
| 2006/0251498 A1 | 11/2006 | Buzzoni et al. | |
| 2007/0040647 A1 | 2/2007 | Saenz et al. | |
| 2007/0262861 A1 | 11/2007 | Anderson et al. | |
| 2007/0285240 A1 | 12/2007 | Sensenig et al. | |
| 2008/0087029 A1 * | 4/2008 | Renken | B60H 1/3226 62/134 |
| 2008/0129490 A1 | 6/2008 | Linville et al. | |
| 2008/0231454 A1 | 9/2008 | Curcio | |
| 2008/0270076 A1 | 10/2008 | Breed | |
| 2009/0216497 A1 | 8/2009 | Schwiers et al. | |
| 2009/0228155 A1 | 9/2009 | Slifkin et al. | |
| 2009/0237258 A1 | 9/2009 | Heck et al. | |
| 2009/0299792 A1 | 12/2009 | Baur et al. | |

\* cited by examiner

IDENTIFICATION AND ASSOCIATION OF REFRIGERATED CONTAINERS WITH DISPATCH ORDERS

RELATED APPLICATIONS

This application is related to U.S. Application Ser. No. 60/884,363 filed Jan. 10, 2007, and to U.S. Application Ser. No. 60/884,183 filed Jan. 9, 2007. Applicant claims the priority benefits of these applications. This is also a continuation of U.S. application Ser. No. 11/971,757, filed 9 Jan. 2008.

FIELD OF THE EMBODIMENTS OF THE INVENTION

The embodiments of the invention relate to method and mean for identification and association of refrigerated shipping containers, with container dispatch orders both on land and sea.

BACKGROUND OF THE EMBODIMENTS OF THE INVENTION

The shipping container industry uses containers to transport goods and services from one country or region to another. The industry attempts to have shipping containers receive dispatch orders from origin to destination, which orders identify the commodity, origin, way points, destination, customer and delivery location. Unfortunately, even relatively complex and expensive wireless devices installed on containers lack ability to operate reliably in multiple countries or regions, and when containers are stacked on ships, transmission of data is difficult and sometimes impossible.

SUMMARY OF EMBODIMENTS OF THE INVENTION

According to an embodiment of the invention, a database dispatches data to a wireless device on the particular source that powers a container during any segment of its journey, and the shipment order is canceled for that segment of the journey from the datatbase.

These and other embodiments of the embodiments of the invention are pointed out in the claims. Other objects and advantages of the embodiments of the invention will become evident from the following detailed description when read in light of the accompanying drawings.

DETAILED DESCRIPTION OF PREFERRED EMBODIMENTS

Figure 1:
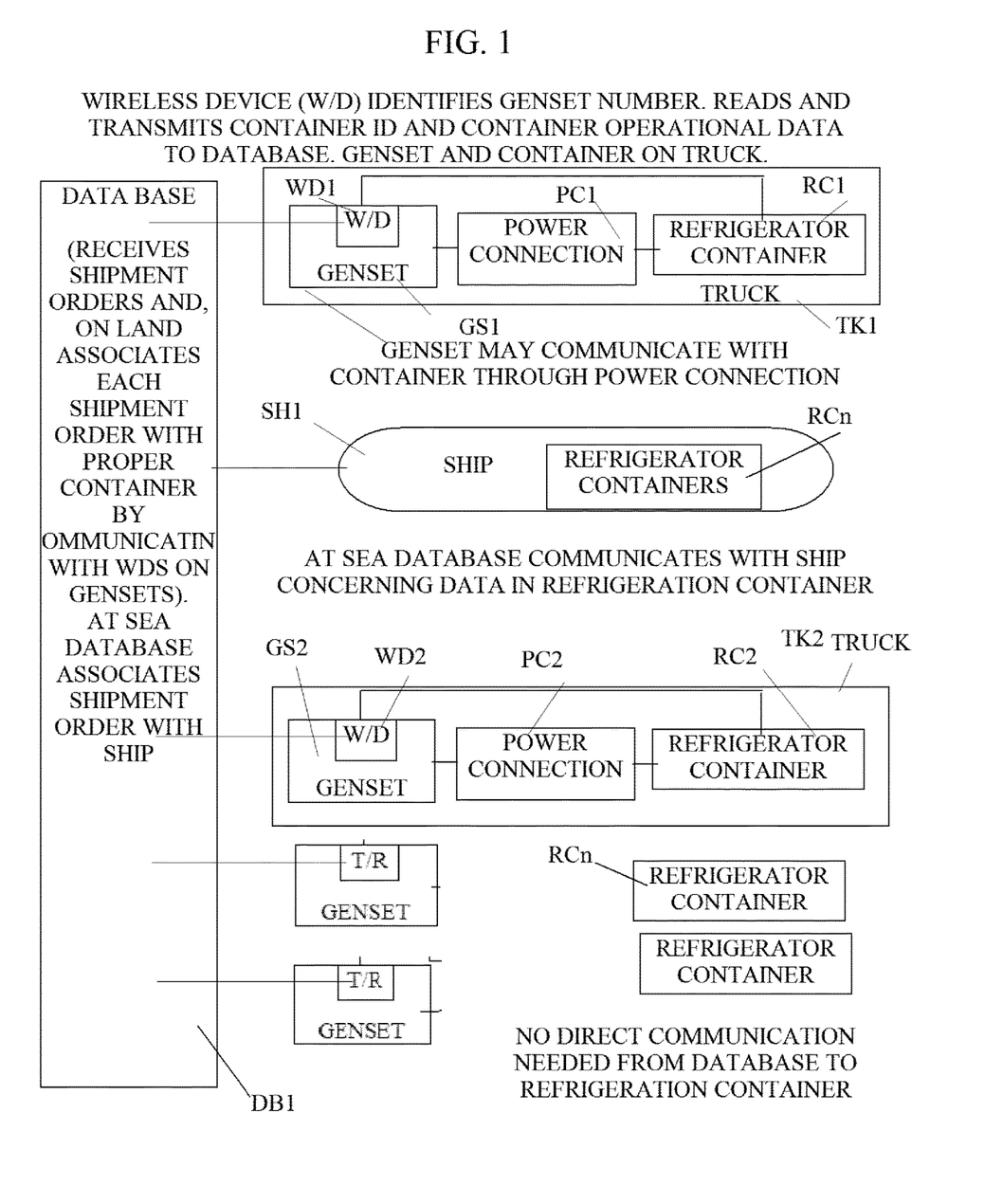
FIG. 1 is a schematic illustration showing embodiments of the invention.

In FIG. 1, trucks TK1 and TK2 carry cargo in the form of a refrigerator container RC1 and RC2, also called "reefers".

The refrigerator containers RC1 and RC2 receive power from respective gensets (e.g. mobile fossil-fuel powered generators used to run electrical devices such as refrigerated containers) GS1 and GS2 via power connections PC1 and PC2. Wireless devices WD1 and WD2 on the gensets GS1 and GS2 communicate with respective refrigerator containers RC1 and RC2 either through respective power connections PC1 and PC2, by wire connection, or wirelessly. The wireless devices WD1 and WD2 identify the respective gensets GS1 and GS2 by genset numbers each assigned to one of the gensets. The wireless devices WD1 and WD2 further read the IDs of the respective containers RC1 and RC2, container operational data, and transmits the information to a database DB1. The database DB1 receives shipment orders and, on land associates each shipment order with the proper container RC1 and RC2 by communicating with the gensets GS1 and GS2. The trucks TK1 and TK2 illustrate two of a number of trucks each loaded with containers similar to containers RC1 and RC2, gensets with wireless devices and power connections all operating like the gensets GS1 and GS2 as well as the wireless devices WD1 and WD2. Each genset is "transient equipment", which will interface to numerous refrigerated containers and be responsible for numerous shipments over time.

In FIG. 1, a ship SH1 carries a multiplicity of refrigerator containers RCn. At sea the database DB1 communicates with the ship SH1 directly to obtain data concerning data in the refrigerator containers RCn. At sea the database associates the shipment order with the ship SH1. Where refrigerator containers are not mounted nor in operation, no direct communication is needed from the database DB1 to the refrigerator container.

FIG. 1 is a generalized version of a system that can include a number of ships SHn with containers RCn, and trucks TKn with containers RCn and gensets GSn.

A genset GSn is attached to a specific refrigerated container RCn when the refrigerated container is transported on the land segment of its journey. The genset temporarily provides fuel and electrical energy to that specific container, and the genset will be used with different refrigerated containers containing different commodities in the future. These embodiments of the invention furnish an electronics systems deployed on each genset GSn, that monitors its location and condition, which interfaces with a microprocessor on the refrigerated container RC1 via a power line modem and the genset-container power cord or a wireless device WDn. Via this interface, when the refrigerated container is turned on, the wireless device WDn may read technical data from the refrigerated container to contain refrigeration data (temperature, operating states) and the refrigerated container number. If the genset is able to logically make the connection to the refrigerated container, then it can transmit the container number and other relevant information via wireless communications with the wireless device WDn.

Figure 2:
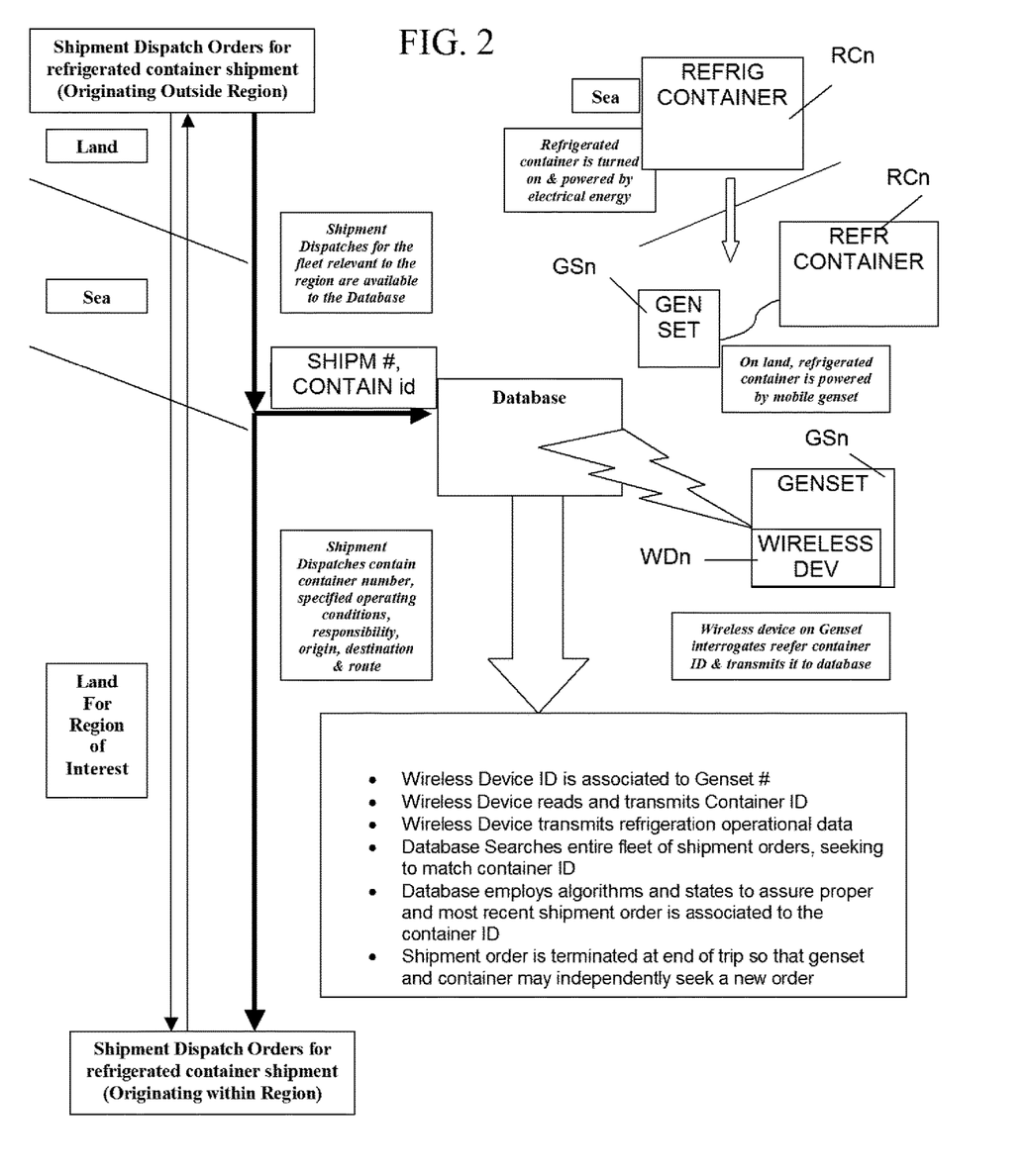
FIG. 2 is a schematic showing illustrating embodiments of the operation of the invention.

FIG. 2 illustrates the method in FIG. 1. At 110, shipment orders for refrigerated container shipment originating outside the region, and at 120 shipment orders for refrigerated containers originating within the region are entered into the database DB1. As shown at 130, shipment dispatches for the fleet relevant to the region are available to the database DB1. As indicated at 140, shipment dispatches contain the container number, specified operating conditions, responsibility, origin, destination, and route. As shown at 150, at sea the container is turned on and powered by electrical energy from the ship. As shown at 160, the refrigerated container is powered by a mobile genset. As shown at 170, the wireless device WD 1 on the genset GSn interrogates the refrigerated container identification ID and transmits it to the database DB1.

In the following steps:

The id of wireless device WDn is associated to the number of the genset GS1.

Wireless device WDn reads and transmits container id.

Wireless device WDn transmits refrigeration operational data.

Database DB1 searches entire fleet of shipment orders, seeking to match container ID.

Database DB1 employs algorithms and states to assure proper and most recent shipment order is associated to the container id.

Shipment order is terminated at end of trip so that genset GSn and container RCn may independently seek a new order.

Figure 3:
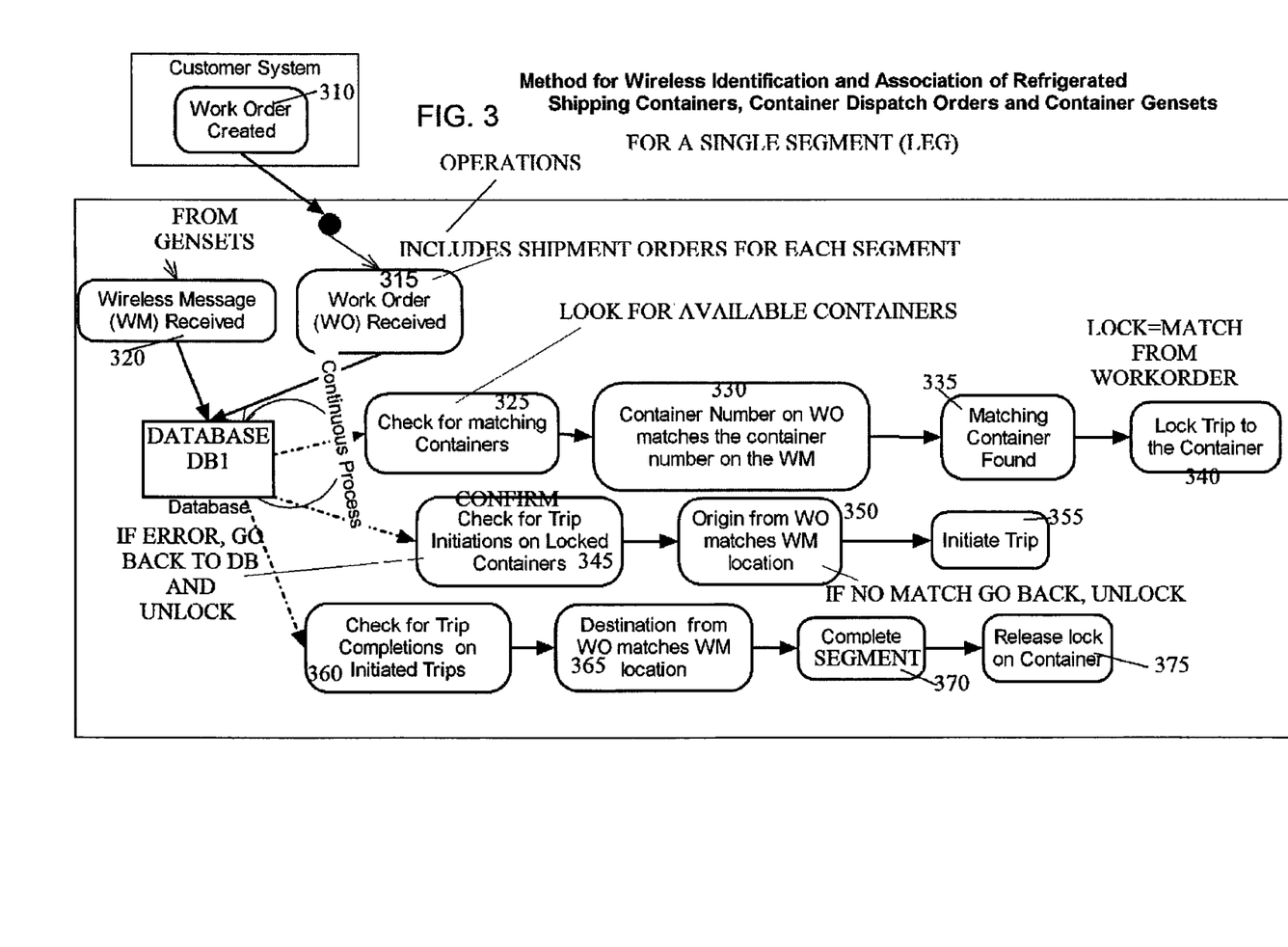
FIG. 3 is a flow chart illustrating steps of embodiments of the invention.

FIG. 3 is a flow diagram of the system in FIG. 1 and the method in FIG. 2 for a single segment or leg of a trip. In step 310, a work order WO (or shipment order or shipment dispatch order) is created in the customer's system, and in step 315 an operations center receives the work order WO and enters it in the database DB1. Wireless messages WM are also received from gensets GSn in step 320 and applied to the database DB1. In step 325, the database DB1 checks for matching containers RCn, i.e. looks for available containers, and in step 330 finds a container whose container number on the work order WO matches a container number received in the wireless message WM, so that in step 335 the database DB1 notes that the matching container has been found. In step 340, a lock trip is established in the database DB1 for the container. In step 345 the database checks and confirms trip initiations on locked containers. In step 345 if an error is found signal back to the database DB1 unlocks the locked container. In step 350, the database matches the origin of the trip from the work order to the location indicated in the wireless message WM from the genset GSn. If there is no match the database DB1 goes back to unlock. If a match exists, the database DB1 initiates a trip in step 355. In step 360, the database DB1 check for trip completion on initiated trips. In step 365, the database DB1 determines whether the destination from the work order WO matches the wireless message WM from the wireless device WDn on the genset GSn. If not the database sends an alarm. If there is a match the database completes a segment or an entire trip in step 370 and releases the lock on the container RCn in step 375.

Figure 4:
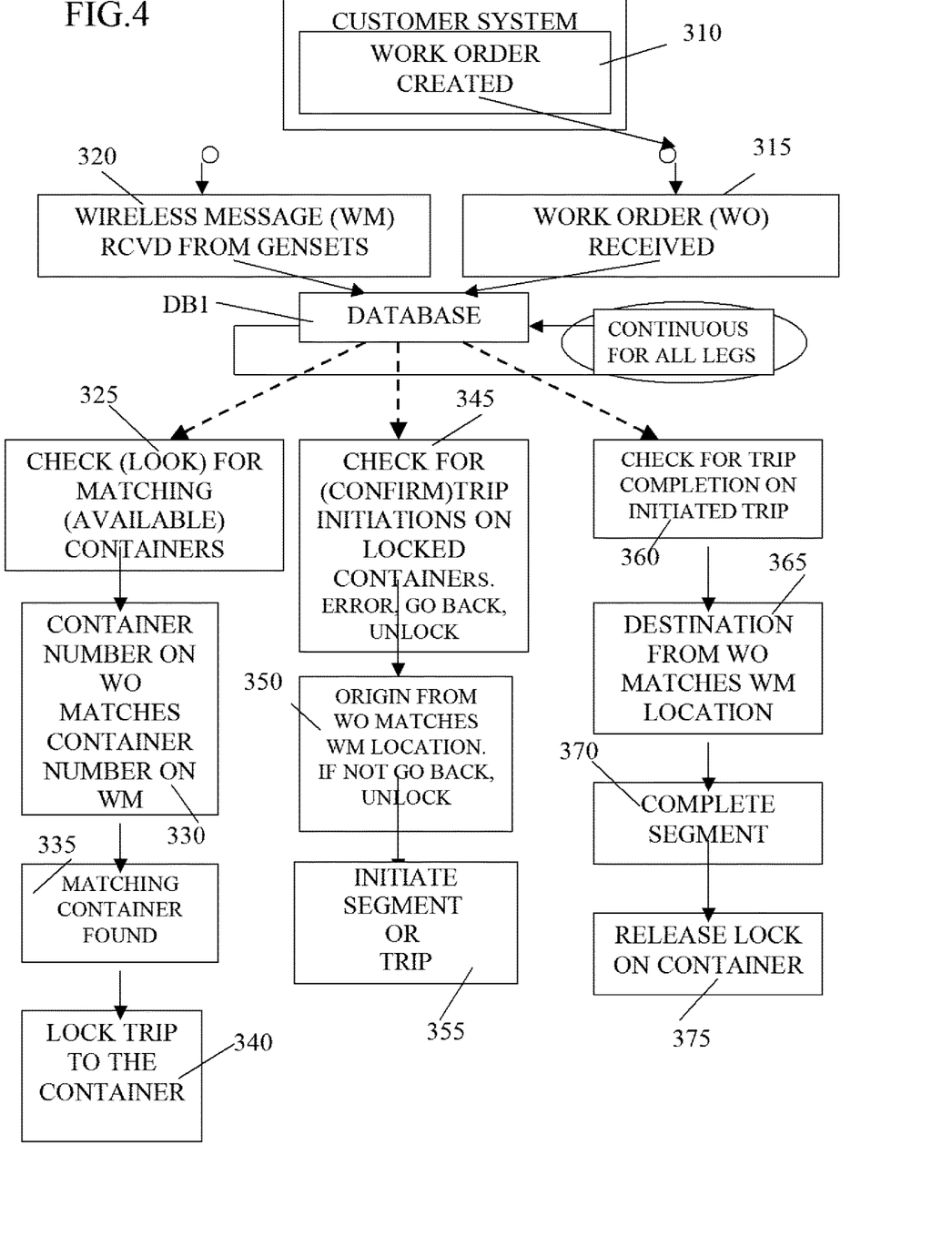
FIG. 4 is another flow chart illustrating steps of embodiments of the invention.

FIG. 4 is a substantial equivalent of FIG. 3 and the reference characters therein correspond to the reference characters in FIG. 3.

Shipment dispatch orders or work orders WO for refrigerated containers RCn cover broad regions, often including a land segment or segment, a sea segment and another land segment of the journey. Shipment orders generally contain an origin, destination, routes, order number, container number, who is responsible for each segment of shipment, and the commodity aboard. Because gensets GSn are used in land segments of a specific region, the embodiments of the invention permit the association of shipment dispatch orders with genset-mounted wireless devices WDn while the refrigerated container RCn is in the land segment of that specific region. The embodiments of the invention overcome the effect of the problems arising from a shipment dispatch order generally that may have been created long in advance of the land segment of the journey in the region of interest, and each genset GSn is "transient equipment", which will interface to numerous refrigerator containers RCn and be responsible for numerous shipments over time.

Each wireless device WDn is a gps wireless device W/D on a refrigeration genset, and serves to (1) retrieve and transmit a refrigerated container identification number and (2), with a database, match that identification number with a shipment document or work order for the refrigerated container. In this manner, a shipment order for a refrigerated container, which contains such relevant information as (1) freight planning information for a commodity, (2) the prescribed temperature control conditions for the shipment, (3) the origin and destination and delivery points for the shipment, (4) the parties responsible for the shipment and (5) the routing and interchange points of the shipment, may be matched to the wireless device on the refrigeration genset while it is attached to the refrigerated container. According to an embodiment, additional freight shipment information is derived by combining the real-time wireless data transmitted by the genset, the container and the shipment information together. This leads to optimization of the shipment and improvement of the reliability via the constant monitoring of the condition of the cargo during the shipment. The process is illustrated in the figures.

These embodiments of the invention utilize the refrigerated container number derived from such a wireless device via wireless transmission to a database. The wireless information contains the serial number of the wireless device on the genset, and by association, the genset number. Therefore, while the genset is attached to the refrigerated container, the wireless device provides an association of the refrigerated container number to the genset, while they are temporarily attached to one another during the shipment. In this manner, the wireless device on the genset identifies a transient association to the container only during a relevant shipment segment of the journey.

Often, because the container has been powered by electrical energy on a ship or on shore, and the shipment dispatch is created well in advance of when the genset is attached to the container and turned on. The shipment dispatch therefore does not contain the genset number. The embodiment of the invention furnishes a procedure that collects all of the container shipment dispatches for the region in a database. Once the genset wireless device identifies the refrigerated container number to the database, a matching procedure is performed that identifies the relevant shipment number by screening through the complete collection of shipment orders for the entire container fleet. In this manner, an association is made between the following elements in the following sequence:

(1) Genset Wireless Device Serial Number/Genset Number
(2) Refrigerated Container Number
(3) Shipment Dispatch or Order Document Number
(4) Relevant Shipment Planning Data (Commodity, temperature set point, origin, destination, route).

By screening the entire lot of shipment orders for a fleet of refrigerated containers, the database DB1 identifies the refrigerated container order number, via the container number, directly to the container number transmitted by the wireless device. In this manner, the database permits an association from the wireless device serial number, the genset number, the refrigerated container ID number and the shipment number, along with all of its associated order information. When this happens, the genset/container/shipment dispatch is determined to be in an "active and initiated" state.

In a second embodiment of the invention, a wireless transmission of a refrigerated container ID may be created prior to the creation of the appropriate shipment dispatch. Therefore, the container ID is held in the database DB1 in an "active, but not initiated shipment" state. This is necessary as the genset GSn and refrigerated container RCn are running, but they are placed in a holding pattern until the necessary shipment document is available.

Because of the disparate timing of the creation of shipment order and the genset/container wireless transmission, container shipments are terminated in the region once each segment. This is necessary to prevent the genset/container wireless transmission to be associated with a previous shipment dispatch order when the new order has yet to be created. The logic of the embodiments of the invention prohibits a match from occurring on a terminated shipment. Because genset/container/shipment dispatches are terminated, the embodiment of the invention creates an "active and initiated" state, when a proper match is achieved. "Active" refers to the condition that the genset/container association has been achieved in the database, and "Initiated" means that the second association with the shipment dispatch has been achieved.

Thus, each genset/container ID newly associated in the database is assigned an "active, but not initiated" state prior to the time a match with the shipment number is made in the database. If the genset/container id association is active for a long enough period of time, it is assumed that the genset/container pair is either (1) being used for some purpose other than a shipment, or (2) the subject of a shipment document error, and the "active but not initiated" state transitions to a "no order" state.

If a shipment order is received for the region, the shipment is presumed to be in an "initiated" state. If, over time, no genset/container association is available, it is a possibility that (1) the wireless device is inoperable, (2) the refrigerated container is not configured with the proper equipment to allow the wireless device to read its information or (3) another error has occurred. This requires that the shipment order be over written by a more recent shipment order, which is then declared "initiated". The older shipment order is ignored therefore for the purpose of matching and thus, genset/container association matches with shipments in the "initiated" state.

In another embodiment, the method also automatically disassociates the genset/container/shipment dispatch order upon completion of the shipment. That is, the system automatically terminates the genset/container/shipment dispatch order upon completion of each segment, including the final segment. In this manner, the wireless device is receptive to identify another container number and dispatch order (as the genset is moved to another container requiring transport), and other dispatch orders responsive to match to other gensets GSn.

Thus the database identifies the operating conditions of the refrigeration system, along with its operating condition, temperatures, locations, fuel levels, etc. with the shipment planning parameters contained in the shipment order, containing the commodity (i.e. frozen meat, fresh broccoli, etc), its shipment origin, its routing, the parties responsible for the shipment and its destination. Thus, an association of the complete shipment plan is associated with wireless derived operational information for each segment of the entire course of the shipment.

The embodiments of the invention match the operational activity of attaching a genset to a refrigerated container with each segment of a shipment dispatch, which contains the refrigerated container number. The figures identify the conditions that are handled by the logic of the database. In order that the database prevent matching errors, the rules are established in the database. Although all shipment dispatches in time are available in the database, are screened to determine "initiated" states, which are the only shipments to be matched. Shipment segments are "terminated" so those are not used when genset/containers deliver their wireless messages prior to initiation of the new relevant shipment segments.

As shown, the shipping container industry uses containers to transport goods and services from one country/region to another. Shipping containers receive dispatch orders from origin to destination, which identify the commodity, origin, waypoints, destination, customer, and delivery location. Efficiencies in the logistical management of container operations is feasible with the use of wireless tracking devices, which can provide location and operational data which can be integrated with dispatch orders. In this manner, shipments management is improved.

Refrigerated containers operate their refrigeration systems on electrical power while they carry shipments on the ship-based segment of the journey and on auxiliary genset power while on the land-based segment of the journey. Because gensets GSn are domiciled in specific countries/regions to power and fuel refrigerated containers when they enter the land-segment of the journey in that country/region, a method exists to utilize the genset as a platform for a wireless device, which reads the refrigerated container identification number and monitors the operating condition. These embodiments of the embodiments of the invention (1) identify a method to associate refrigerated container shipment dispatch orders (when they embark at a port via container ship or originate shipment in the interior of a country) with wireless devices installed on refrigerated container gensets GSn domiciled in a single region, which can track and monitor the refrigerated container's progress for the shipment in that region and (2) provide for unique database logic to assure that a correct, error-free match between refrigerated container and shipment dispatch order exists.

Embodiments of the invention match a shipment order, with specific segments, in the database with the wireless notification message that the database receives from a genset, and which the genset receives from the container with the container number. The genset communicates with container over the power line over which the genset energizes the container. Initial communication occurs when the power line connects the genset to container. The embodiments of the invention involve terminating shipment segments, including the final segment of a shipment, so new matches can be made. Termination occurs by responding to removal of the power line from the genset to the container at the end of a shipment segment or the end of the shipment. The system overwrites any old genset communication when a power line connects a new genset to the container.

According to another embodiment of the invention an operational service delivers an event and alarm system distributed to a Shipping Company's Protective Service Responsible Parties (PSRP's). It delivers automatic event and alarm information for each shipment order to PSRP's responsible for Shipment Origin, Destination or Interchange location (SODIL), rail shipments and trucker dispatches.

Figure 5:
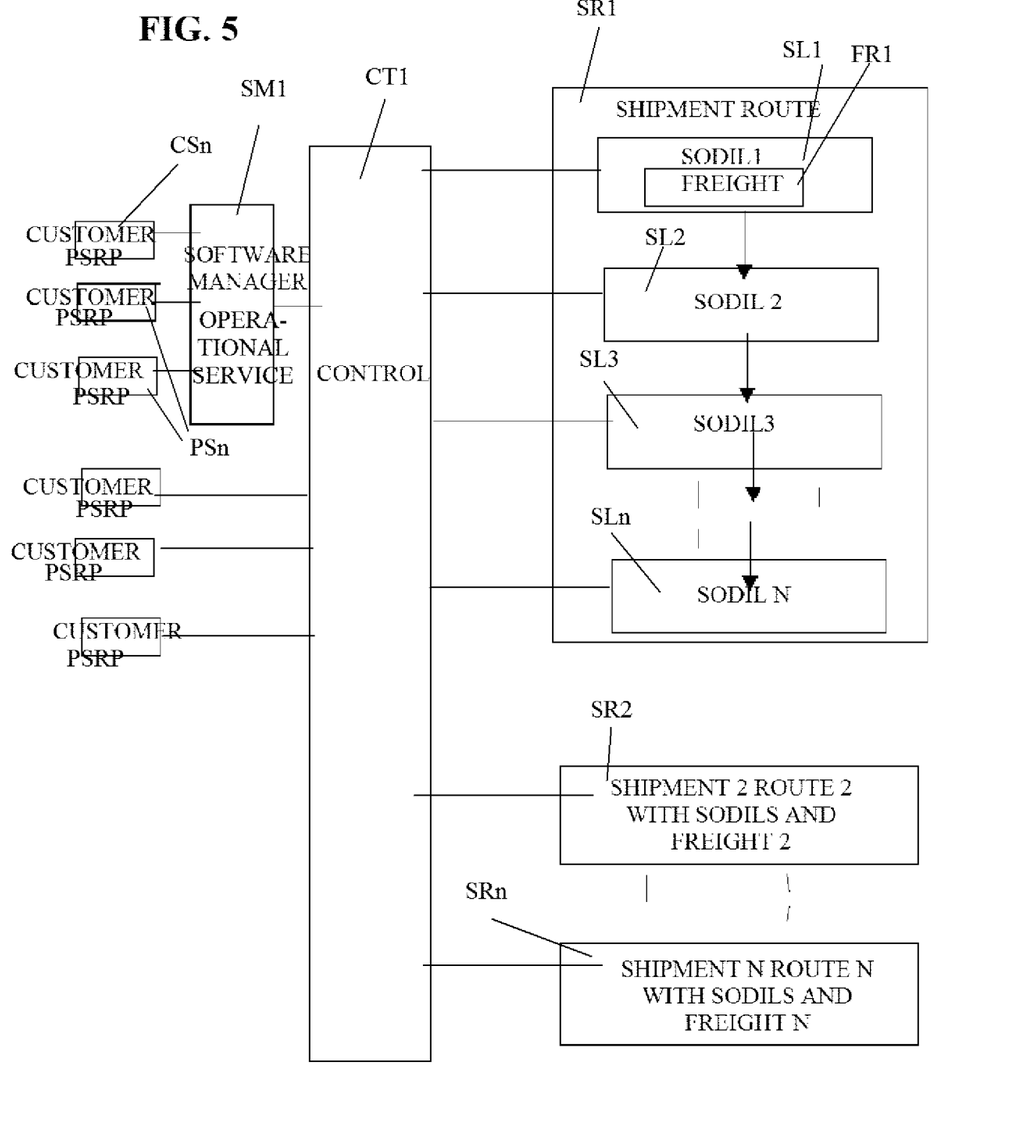
FIG. 5 is a schematic illustration showing embodiments of the invention.

As shown in FIG. 5 a software manager or operational service SM1 communicates with customers or PSRPs CSn and operates a control CT1, for example in the form corresponding to the database DB1. The latter also communicates with freight FR1 . . . FRn, in the form of refrigerated cars RCn connected via power connections PCn to gensets GS1 with wireless devices WDn, at SODILs SL1, SL2, SL3, . . . SLn along each of a number of shipment routes SR1, SR2, . . . SRn.

Figure 6:
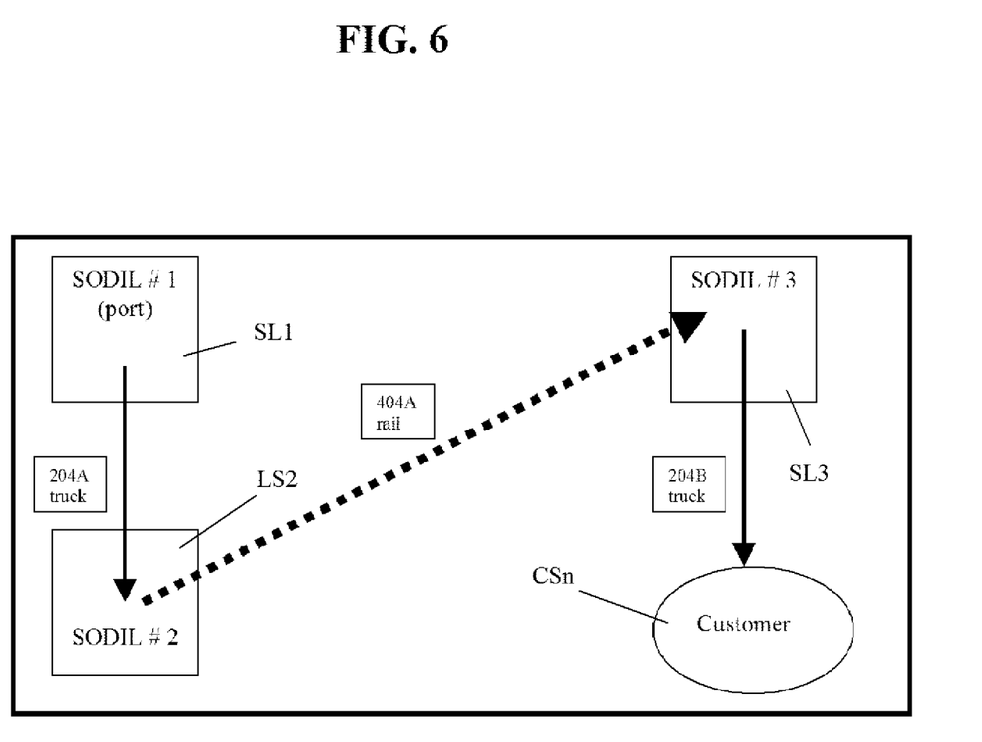
FIG. 6 is a schematic showing of embodiments of the invention.

FIG. 6 shows a shipment from a port via a truck via rail and again via truck to a customer. The control CT1 communicates with the freight FR1, as it passes from SODIL #1 such as a port via a truck to a SODIL #2, via rail to a SODIL #3, and via truck to customer CSn.

The embodiment sets up a master file of PSRP's, containing their electronic contact information (email, cellular or both). In operation, a Shipping Company delivers standard EDI (Electronic Data Interchange) bill of lading transaction (204 for truck shipments and 404 for rail shipments) documents electronically to an operations center of a software manager or operational service SM1 for entry into the database DB1 for each refrigerated container shipment. The database DB1 then utilizes the genset GSn to identify the container number when the reefer, i.e. refrigerated container RCn, and genset are connected at shipment origin. The database DB1 then delivers wireless event and alarm information to the PSRP's identified on the EDI planning documents (rail or truck) or to the relevant Shipment Origin, Destination or Interchange location.

The information delivery within each email or cellular message includes: Container number.
  Genset number.
  EDI 404 or 204 reference number.
  Event type.
  Alarm condition (if any).
  GPS location (map with email).
  Conditional genset and reefer information.

According to an embodiment, the Shipping Company's shipping system for refrigerated containers is for example represented in the FIGS. 5 and 6. The shipment is governed by shipment origination and planning documentation, which is formatted in standard EDI transaction formats (404 for rail, 204 for truck dispatch):

Shipments within the 404 and 204 systems involve routing through standard shipping locations within the shipping company's infrastructure, called Shipment Origin, Destination or Interchange locations. The shipping company may support 250 or more Shipment Origin, Destination or Interchange locations within North America. They include company owned and/or operated port facilities, rail operated intermodal ramps (access and disembarking points), and third party support locations. Shipment Origin, Destination or Interchange locations are accessible via rail and truck (container/chassis) operations (as well as container ship in the case of port facilities). Importantly, Shipment Origin, Destination or Interchange locations are not the same as customer drop off locations for in-bound shipments. Conversely, customer locations (not Shipment Origin, Destination or Interchange locations) often serve as origin points of shipments.

This embodiment allows for delivery of event and alarm information to the parties that the Shipping Company has assigned PSRP'S responsibility for the shipment(s). Components of the system are discussed individually as follows:

Delivery/Receipt of 404 and 204 transactions: The shipping company electronically delivers EDI standard 404 and 204 transactions associated with every refrigerated container shipment in North America. Due to the volume, this would be preferably performed via a web-services mechanism, although the database DB1 may be able to work with other mechanisms available to the shipping company.

Processing of 404/204 transactions: The database DB1 acts to process the 404/204 transactions in anticipation of delivering wireless information to the PSRPs, some of whom are identified within the EDI message. The 404/204 transaction are initially established as "Active but not Initiated". The database DB1 serves to establish a "trip plan" for each container by virtue of the information within the 404/204 messages, linking origin and destination via Shipment Origin, Destination or Interchange locations. "Active but not Initiated" means that the database DB1 has received a 404 or 204 work order, but has not received a wireless communication from the genset/container pairing.

Active Shipments: The GPS/Genset wireless solution delivers container numbers to the database DB1 via each monitoring device, i.e. wireless device WDn, installed on each genset when the genset and reefer are turned on and connected. At shipment initiation, the database DB1 will associate this container/genset pair with the relevant 404/204 trip plan. Once this association is made, the "Active but not Initiated" trip plan becomes "Active". At this point, the database DB1 is prepared to deliver (and actually delivers the first message of) reefer container and genset event and alarm information via email and cellular device to the PSRP's. This would occur regardless of the gps location (Shipment Origin, Destination or Interchange location, customer or otherwise).

Distribution of wireless messages (Addressing): By receipt of the 404 and 204 planning information, the database DB1 will deliver wireless event and alarm messages to the relevant parties. This is achieved via the use of a master file, which maintains configuration control of the shipping company's authorized parties responsible for Protective Services (along with their wireless email and cellular addresses). The shipping company would be able to edit this file and release it from time to time into the database DB1's system. The notifications would also be sent to the shipping company Operations so that they may monitor any critical movements. Similarly, maintenance related notifications are sent to MESC (either centrally or in a distributed fashion dependent on similar 404/204 logic).

Logic to determine proper Responsible Party: PSRP's are broken down into three categories:
1. Shipment Origin, Destination or Interchange PSRPs
2. Truck dispatch PSRPs
3. Rail PSRPs Shipment Origin, Destination or Interchange notification: The embodiment utilizes geofences to identify whether a Genset/Reefer is within a Shipment Origin, Destination or Interchange location. If a trip plan is "Active" and the shipment is within any Shipment Origin, Destination or Interchange location, then notification will be addressed to the PSRP relevant to that Shipment Origin, Destination or Interchange location. In FIGS. 5 and 6 at shipment initiation, the PSRP of Shipment Origin, Destination or Interchange #1 would receive event information directly.

Truck dispatch PSRP: The database DB1 acts to deliver any event information relevant to the 204 shipment to the PSRP identified by code number on the 204 document. In the case of 204A in the figures, especially 5 and 6, the database DB1 acts to deliver event and alarm information once the genset delivered the Out of Geofence wireless notification associated with Shipment Origin, Destination or Interchange #1. In the figures, the truck PSPR continues to receive events/alarms associated with the shipment until arrival at Shipment Origin, Destination or Interchange #2, at which point, message deliver would transition once again.

Rail dispatch PSRP: Once 404 shipments are outside of Shipment Origin, Destination or Interchange locations, event and alarm information is distributed to the responsible PSRP for rail. If Canadian National or Canadian Pacific is identified on the 404 documentation, they receive the wireless messages. Otherwise, the message delivery is made to Mark-it Services. In the figures, this occurs until the third Shipment Origin, Destination or Interchange location was reached via geofence.

Completing Shipments: For the purpose of delivering wireless notifications, the database DB1 completes and closes out trip plans. This is important to prevent false positive messages to be delivered to PSRPs after shipments are made. Completion occurs upon the receipt of a Reefer and Genset Off wireless message and physical delivery to a Shipment Origin, Destination or Interchange location (Geofence). Alternatively, if a reefer is outside of a Shipment Origin, Destination or Interchange location, receipt of another 204 and/or 404 message constituting a separate trip plan (i.e. reefer off) completes the previous trip plan.

Inactive Shipments: Trip plans will become "Inactive" (for the purpose of delivering messages to PSRP's) if:
1. Valid 404/204 transactions are delivered to the database DB1, but and no corresponding container numbers are delivered to the database DB1 (i.e. in the case of an empty shipment where the reefer remains off, the trip plan will transition from an "Active but not initiated" state to an "Inactive" state after X days.
2. If valid 404/204 transactions are delivered to the database DB1 for the same container number which conflict with one of an earlier origination date. In this instance, the trip plan will be based on the bills of lading with the latest origination dates.

Data Storage and History: Trip plans are stored and available by container number, genset number, 404 or 204 numbers. A record of distributed event and alarm message delivery is retained in a "storage bin" for each trip plan.

Shipment dispatch orders for refrigerated containers cover broad regions, often including a land segment, a sea segment and another land segment of the journey. Because gensets GSn are used in land segments of a specific region, this method permits the association of shipment dispatch orders with genset-mounted wireless devices while the refrigerated container is in the land segment of that specific region. Inventive techniques are necessary, because the shipment dispatch order may generally be created long in advance of the land segment of the journey in the region of interest, and the genset is "transient equipment", which will interface to numerous refrigerated containers and be responsible for numerous shipments over time.

The embodiments utilize a gps wireless device on a refrigeration genset, to (1) retrieve and transmit a refrigerated container identification number and (2) match that identification number with a shipment document or work order for the refrigerated container. In this manner, a shipment order for a refrigerated container, which contains such relevant information as (1) freight planning information for a commodity, (2) the prescribed temperature control conditions for the shipment, (3) the origin and destination and delivery points for the shipment, (4) the parties responsible for the shipment and (5) the routing and interchange points of the shipment, may be matched to the wireless device on the refrigeration genset while it is attached to the refrigerated container. Additional freight shipment information may be derived by combining the real-time wireless data transmitted by the genset, the container and the shipment information together, leading to optimization of the shipment and improvement of the reliability via the constant monitoring of the condition of the cargo during the shipment. This optimization of the reefer container, genset and shipment order is the subject of another patent application A genset is attached to a specific refrigerated container, when the refrigerated container is transported on the land segment of its journey. The genset temporarily provides fuel and electrical energy to that specific container, and the genset will be used with different refrigerated containers containing different commodities in the future. These embodiments of the invention include an electronics systems deployed on the genset, that monitors its location and condition, which interfaces to the microprocessor on the refrigerated container via a power line modem and the genset-container power cord or a wireless device. Via this interface, when the refrigerated container is turned on, the wireless device may read technical data from the refrigerated container to contain refrigeration data (temperature, operating states) and the refrigerated container number. If the genset is able to logically make the connection to the refrigerated container, then it can transmit the container number and other relevant information via wireless communications.

The embodiments utilize the refrigerated container number derived from such a wireless device via wireless transmission to a database. The wireless information contains the serial number of the wireless device on the genset, and by association, the genset number. Therefore, while the genset is attached to the refrigerated container, the wireless device provides an association of the refrigerated container number to the genset, while they are temporarily attached to one another during the shipment. In this manner, the wireless device on the genset identifies a transient association to the container only during a relevant shipment segment of the journey.

Often, because the container has been powered by electrical energy on a ship or on shore, the shipment dispatch is created in well in advance of when the genset is attached to the container and turned on. The shipment dispatch therefore does not contain the genset number. The embodiments of the invention provide a programming procedure which collects all of the container shipment dispatches for the region in a database. Once the genset wireless device identifies the refrigerated container number to the database, a matching procedure is performed that identifies the relevant shipment number by screening through the complete collection of shipment orders for the entire container fleet. In this manner, an association is made between the following elements in the following sequence:
  (1) Genset Wireless Device Serial Number/Genset Number
  (2) Refrigerated Container Number
  (3) Shipment Dispatch or Order Document Number
  (4) Relevant Shipment Planning Data (Commodity, temperature set point, origin, destination, route).

By screening the entire lot of shipment orders for a fleet of refrigerated containers, it is feasible to identify the refrigerated container order number, via the container number, directly to the container number transmitted by the wireless device. In this manner, the database permits an association from the wireless device serial number, the genset number, the refrigerated container ID number and the shipment number, along with all of its associated order information. When this happens, the genset/container/shipment dispatch is determined to be in an "active and initiated" state.

In an embodiment of the invention, a wireless transmission of a refrigerated container ID may be created prior to the creation of the appropriate shipment dispatch. Therefore, the container ID is held in the database in an "active, but not initiated shipment" state. This is necessary as the genset and refrigerated container are running, but they are placed in a holding pattern until the necessary shipment document is available.

Because of the disparate timing of the creation of shipment order and the genset/container wireless transmission, container shipments is terminated in the region. This is necessary to prevent the genset/container wireless transmission to be associated with a previous shipment dispatch order when the new order has yet to be created. The logic of the embodiments of the invention prohibits a match from occurring on a terminated shipment. Because genset/container/shipment dispatches are required to be terminated, it is also necessary to create an "active and initiated" state, when a proper match is achieved. "Active" refers to the condition that the genset/container association has been achieved in the database, and "Initiated" means that the second association with the shipment dispatch has been achieved.

Thus, each genset/container ID newly associated in the database is assigned an "active, but not initiated" state prior to the time a match with the shipment number is made in the database. If the genset/container id association is active for a long enough period of time, it is assumed that the genset/container pair is either (1) being used for some purpose other than a shipment, or (2) the subject of a shipment document error, and the "active but not initiated" state transitions to a "no order" state.

If a shipment order is received for the region, the shipment is presumed to be in an "initiated" state. If, over time, no genset/container association is available, it is a possibility that (1) the wireless device is inoperable, (2) the refrigerated container is not configured with the proper equipment to allow the wireless device to read its information or (3) another error has occurred. This requires that the shipment order be over written by a more recent shipment order, which is then declared "initiated". The older shipment order is ignored therefore for the purpose of matching and thus, genset/container association matches with shipments in the "initiated" state.

The embodiments match the operational activity of attaching a genset to a refrigerated container with a shipment dispatch, which contains the refrigerated container number. The figures identify the conditions that are handled by the logic of the database. In order that the database prevent matching errors, the rules need to be established in the database, which are the subject of these embodiments of the invention. Although all shipment dispatches in time are available in the database, these need to be screened to determine "initiated" states, which are the only shipments to be matched. Shipments need to be "terminated" so those are not used when genset/containers deliver their wireless messages prior to initiation of the new relevant shipments.

According to an embodiment, the method also automatically disassociates the genset/container/shipment dispatch order upon completion of the shipment. In this manner, the wireless device is then receptive to identify another container number and dispatch order (as the genset is moved to another container requiring transport), and other dispatch orders is responsive to match to other gensets GSn.

Thus, in the database, it is feasible to identify the operating conditions of the refrigeration system, along with its operating condition, temperatures, locations, fuel levels, etc. with the shipment planning parameters contained in the shipment order, containing the commodity (i.e. frozen meat, fresh broccoli, etc), its shipment origin, its routing, the parties responsible for the shipment and its destination. Thus, an association of the complete shipment plan is associated with wireless derived operational information for the entire course of the shipment.

Wireless communications allows the deployment of devices which provide freight transport operators with real-time logistical and refrigeration status of their refrigerated transport equipment. Shipment dispatch orders provide for the planning of refrigerated transport shipments. The combination of shipment dispatch orders and wireless communications allows for the optimization of refrigerated freight transport operations.

For refrigerated shipments, shipment dispatch orders, among other things, document the origin, destination, prescribed routing, commodity, the prescribed temperature control conditions and the parties responsible for the shipment. Wireless monitoring of refrigerated transport equipment, specifically measuring the operational parameters within the microprocessor controller of the refrigeration unit, provides specialized data that is unique to refrigeration, such as the on, off or shutdown state, the set point temperature, the mode of operation, alarm conditions, door state, fuel level state, etc. These embodiments of the invention provides for a method to match the shipment dispatch order for a specific refrigeration transport unit (trailer, truck, railcar or container) with data received from a wireless communications device, which is mounted on or transiently has the means to monitor the refrigeration unit, and use data delivered via wireless transmissions, some of it unique to refrigeration transport, with the desired result and end product of automatically managing the shipment.

Automatically managing the shipment means (1) initiating shipments automatically, (2) showing automatic status of shipments entering or leaving designated locations during the course of a shipment, (3) providing automatic notifications of shipment status and problems to parties specifically assigned to a segment or operation of the shipment, (4) monitor irregularities of the shipment centrally and (5) terminate shipments automatically. When the entire collection of shipments for an entire fleet of refrigeration units is managed centrally within a system, it is feasible to automatically establish the operational condition of unutilized refrigeration transport equipment within the fleet, categorizing the units by technically available for use by location, or region, requiring fuel but otherwise technically available, requiring maintenance or a preventative maintenance check, or requiring a refrigeration pre-trip, leading to improved inventory management of unutilized equipment.

Shipment dispatch orders for refrigerated transport equipment, including container/genset combinations, trailers, railcars and trucks, plan the routing for shipments over broad regions throughout the journey. Certain complex freight systems use designated routing locations, which are used physically to check in and out refrigerated transport equipment periodically from origin to destination. Certain simple freight systems provide for direct routing from origin to destination, but even in the most simple of routing, the use of designated locations, or "locations of interest", such as an origin or destination location are frequently used. Shipment dispatch orders designate the use of specific routes or travel through specific designated locations. Generally, traditional check in/check out procedures are slow and error prone, based on manual entry, and due somewhat to the changeover of personnel, the condition of the refrigeration shipment is treated with inconsistent quality. With the availability of wireless tracking, monitoring and control devices for refrigeration units, improvements in operations may result from the availability of real-time status from specific refrigerated transport equipment. This method optimizes the relationship between the shipment dispatch order and wirelessly tracked and monitored refrigerated transport equipment, utilizing the data unique to refrigeration transport equipment to optimize the freight shipment.

This method furnishes a freight system that utilizes a gps wireless device on a refrigerated trailer, railcar, truck or container genset, to (1) transmit a unique identification number that can matched in a database with the identification number of the reefer or transmit directly the identification number of the reefer and (2) match that identification number with a shipment document or work order for the refrigerated transport equipment. In this manner, a shipment order for a refrigerated container, which contains such relevant information as (1) freight planning information for a commodity, (2) the prescribed temperature control conditions for the shipment, (3) the origin and destination and delivery points for the shipment, (4) the parties responsible for the shipment and (5) the routing and interchange points of the shipment, may be matched to the wireless device on the refrigerated transport unit or genset while it is attached to the a refrigerated container. By allowing for the matching of the shipment order and refrigerated transport unit, the wireless data may be used to (1) automatically originate the shipment when the refrigeration is turned on and has been matched to the shipment order, (2) establish a "matched and initiated trip" state, which is used to track the entire journey and individual trip segments between designated routing locations, (3) automatically log in and log out reefer units to designated locations while in the "matched and initiated" state, (4) identify responsible parties (also known as "protective service responsible parties" or PSRP's) from the shipment document and in the computer system, automatically designate the proper PSRP as "active" for the appropriate trip segment derived from the wireless data from the refrigerated transport unit, (5) evaluate real-time irregularities with the shipment which conflict with the shipment documentation and send such alarm and event notifications to the appropriate PSRP for the specific refrigerated transport unit number in the event human intervention is required, and (6) terminate trip segments and trips based on programming logic acting on wireless data that is transmitted from the refrigeration unit. The unique and important aspect of these embodiments of the invention is that the refrigeration unit's operational state (as derived from the refrigeration unit) is a criteria to continuously link the wireless derived data with the shipment planning order, until the refrigeration unit enters or exhibits conditions (i.e. arrives at destination and the refrigeration unit is turned off locally at the equipment) when the programming allows the shipment to be terminated.

A representative shipment routing process is illustrated in the figures.

These embodiments of the invention furnish a freight system that utilizes a gps wireless device on a refrigerated trailer, railcar, truck or container genset, which (1) transmits a unique identification number that can associated in a database with the identification number of the reefer or transmit directly the identification number of the reefer and (2) associates that identification number with a shipment document or work order for the refrigerated transport equipment in a computer system.

These embodiments of the embodiments of the invention utilizes the condition of the refrigeration transport equipment to improve the certainty that an appropriate association is made between the equipment in real-time and a collection of shipment dispatch orders for the same equipment, which may be obsolete. When a wireless message containing a refrigeration transport equipment number and a turning on the reefer unit locally accompanied by the delivery of a set point, then a match may be made between a collection of shipment orders by associating the asset number, knowledge that the reefer has been turned on and the set point is appropriately set to the commodity. The shipment plan is thus in an "active and initiated" state, meaning that the refrigeration equipment is turned on (active) and matched to the origin of a shipment plan (initiated).

Shipment routing designated locations are available on the asset via the use of a "geofence", or an area defined by gps coordinates, which allows the wireless device to transmit a message when entering or leaving. If the geofence locations loaded into the firmware of the wireless device on the refrigeration unit correspond to the collection of designated locations, then wireless transmissions occurs whenever any particular unit in a fleet entered or left a designated location. These embodiments of the embodiments of the invention claim involves the predetermination that a shipment order is "active and initiated", and that a designated location is available as a geofence on the asset, and the designated location is defined on the shipment order as a routing junction, which might be linked to a previous designated location and collectively called a segment, and the shipment order identifies a PSRP responsible for the shipment through the duration of the segment, then the trip segment can be automatically traced in the programming system by the wireless device. Should an irregularity occur during the segment journey, such as a refrigeration alarm condition or an inadvertent refrigeration shutdown, then a wireless notification is sent to the PSRP for retrieval by cell phone or pager or personal computer notifying the PSRP to take care of the irregular condition.

According to the figures, once an "active and initiated" shipment leaves shipment origin in the prescribed operational state (reefer on, set point correct), then responsibility for the shipment is assigned to PSRP 1. Once this shipment physically arrives into Designated Location 1 without any irregularities, then the segment can be terminated in the programming system, and responsibility for the shipment is transferred to the management of Designated Location 1. Upon leaving Designated Location 1 in an "active and initiated" state, then the shipment segment responsibility is assigned to PSRP2, who is identified on the shipment order. This process continues, until Designated Locations for the shipments are exhausted and all the shipment segments except the last one are terminated.

These embodiments of the invention produce the completion or termination of individual trip segments of a route for an overall shipment plan. The embodiments of the invention provide more enhanced logic when the refrigerated transport unit travels outside of the final designated location to the delivery location. At this point, the system knows from the matching of the trip segments to wireless status information that the shipment is currently in the last (delivery) segment. At this point, the system searches for wireless information that is indicative of a shipment delivery. For instance, should the wireless monitoring device on the asset detect that a tractor has become disconnected from the trailer in the final segment of a journey, then this would constitute an indication that the reefer unit is close to destination, as it is dropped off in a yard. Subsequent messages, such as "door open" would be indicative of an unload event. Further, turning off the refrigeration unit locally would be the indication of the final destination. A dwell time exceeding a prescribed limit after the refrigeration unit is turned off may be a factor in the automatic declaration that the shipment has arrived at destination. Finally, the geographic return of the reefer to any designated location with the reefer unit off designates a certainty that the delivery has been automatically made. In this manner, users may designate the standard sequence of refrigeration unit specific events transmitted via wireless communications, which indicate that a shipment has arrived at destination. Once this series of events is received in the last segment, the final trip segment is terminated and the overall shipment dispatch work order may be terminated. In this manner, the shipment dispatch work order is not available in the future for newly "active" refrigerated shipments.

With the proliferation of an entire fleet of refrigeration units within the context of this matching and segment termination methodology, refrigerated trailers that are not in use may be evaluated for their dwell time, suitability for use, fuel levels and future use plans. If all trailers are to be associated with shipments during use, then wireless management of unassociated trailers offers significant potential for operational efficiency. Thus, the collection of unassociated trailers can be categorized in an inventory system for management to assign (i.e. working properly and available for shipment, requires maintenance, requires fuel, requires pre-trip, requires preventative maintenance).

Further, exceptions to the trip activity may be evaluated to assure that operational efficiencies are maintained. For instance, matching shipment orders to refrigeration activity with automatic forced termination of shipments based on reefer conditional information leads to the ability to examine refrigeration units that remain on for long periods of time at customers' facilities.

Wireless communications allows the deployment of devices which provide freight transport operators with real-time logistical and refrigeration status of their refrigerated transport equipment. Shipment dispatch orders provide for the planning of refrigerated transport shipments. The combination of shipment dispatch orders and wireless communications allows for the optimization of refrigerated freight transport operations.

For refrigerated shipments, shipment dispatch orders, among other things, document the origin, destination, prescribed routing, commodity, the prescribed temperature control conditions and the parties responsible for the shipment. Wireless monitoring of refrigerated transport equipment, specifically measuring the operational parameters within the microprocessor controller of the refrigeration unit, provides specialized data that is unique to refrigeration, such as the on, off or shutdown state, the set point temperature, the mode of operation, alarm conditions, door state, fuel level state, etc. This embodiment of the invention provides a method to match the shipment dispatch order for a specific refrigeration transport unit (trailer, truck, railcar or container) with data received from a wireless communications device, which is mounted on or transiently has the means to monitor the refrigeration unit, and use data delivered via wireless transmissions, some of it unique to refrigeration transport, with the desired result and end product of automatically managing the shipment. Automatically managing the shipment means (1) initiating shipments automatically, (2) showing automatic status of shipments entering or leaving designated locations during the course of a shipment, (3) providing automatic notifications of shipment status and problems to parties specifically assigned to a segment or operation of the shipment, (4) monitor irregularities of the shipment centrally and (5) terminate shipments automatically. When the entire collection of shipments for an entire fleet of refrigeration units is managed centrally within a system, it is feasible to automatically establish the operational condition of unutilized refrigeration transport equipment within the fleet, categorizing the units by technically available for use by location, or region, requiring fuel but otherwise technically available, requiring maintenance or a preventative maintenance check, or requiring a refrigeration pre-trip, leading to improved inventory management of unutilized equipment.

Shipment dispatch orders for refrigerated transport equipment, including container/genset combinations, trailers, railcars and trucks, plan the routing for shipments over broad regions throughout the journey. Certain complex freight systems use designated routing locations, which are used physically to check in and out refrigerated transport equipment periodically from origin to destination. Certain simple freight systems provide for direct routing from origin to destination, but even in the most simple of routing, the use of designated locations, or "locations of interest", such as an origin or destination location are frequently used. Shipment dispatch orders designate the use of specific routes or travel through specific designated locations. Generally, traditional check in/check out procedures are slow and error prone, based on manual entry, and due somewhat to the changeover of personnel, the condition of the refrigeration shipment is treated with inconsistent quality. With the availability of wireless tracking, monitoring and control devices for refrigeration units, improvements in operations may result from the availability of real-time status from specific refrigerated transport equipment. This method optimizes the relationship between the shipment dispatch order and wirelessly tracked and monitored refrigerated transport equipment, utilizing the data unique to refrigeration transport equipment to optimize the freight shipment.

This method furnishes a freight system that utilizes a gps wireless device on a refrigerated trailer, railcar, truck or container genset GSn, to (1) transmit a unique identification number that can matched in a database DB1 with the identification number of the reefer or transmit directly the identification number of the reefer and (2) match that identification number with a shipment document or work order for the refrigerated transport equipment. In this manner, a shipment order for a refrigerated container, which contains such relevant information as (1) freight planning information for a commodity, (2) the prescribed temperature control conditions for the shipment, (3) the origin and destination and delivery points for the shipment, (4) the parties responsible for the shipment and (5) the routing and interchange points of the shipment, may be matched to the wireless device on the refrigerated transport unit or genset while it is attached to the a refrigerated container. By allowing for the matching of the shipment order and refrigerated transport unit, the wireless data may be used to (1) automatically originate the shipment when the refrigeration is turned on and has been matched to the shipment order, (2) establish a "matched and initiated trip" state, which is used to track the entire journey and individual trip segments between designated routing locations, (3) automatically log in and log out reefer units to designated locations while in the "matched and initiated" state, (4) identify responsible parties (also known as "protective service responsible parties" or PSRP's) from the shipment document and in the computer system, automatically designate the proper PSRP as "active" for the appropriate trip segment derived from the wireless data from the refrigerated transport unit, (5) evaluate real-time irregularities with the shipment which conflict with the shipment documentation and send such alarm and event notifications to the appropriate PSRP for the specific refrigerated transport unit number in the event human intervention is required, and (6) terminate trip segments and trips based on programming logic acting on wireless data that is transmitted from the refrigeration unit. An embodiment of this invention assures that the refrigeration unit's operational state (as derived from the refrigeration unit) is a criteria to continuously link the wireless derived data with the shipment planning order, until the refrigeration unit enters or exhibits conditions (i.e. arrives at destination and the refrigeration unit is turned off locally at the equipment) when the system allows the shipment to be terminated.

This embodiment of the invention furnishes a freight system that utilizes a gps wireless device on a refrigerated trailer, railcar, truck or container genset, which (1) transmits a unique identification number that can associated in a database with the identification number of the reefer or transmit directly the identification number of the reefer and (2) associates that identification number with a shipment document or work order for the refrigerated transport equipment in a computer system. The methodology of achieving the association between the wireless information and the shipment order is the subject of a previous patent application.

This embodiment of the invention utilizes the condition of the refrigeration transport equipment to improve the certainty that an appropriate association is made between the equipment in real-time and a collection of shipment dispatch orders for the same equipment, which may be obsolete. When a wireless message containing a refrigeration transport equipment number and a turning on the reefer unit locally accompanied by the delivery of a set point, then a match may be made between a collection of shipment orders by associating the asset number, knowledge that the reefer has been turned on and the set point is appropriately set to the commodity. The shipment plan is thus in an "active and initiated" state, meaning that the refrigeration equipment is turned on (active) and matched to the origin of a shipment plan (initiated).

Shipment routing designated locations are available on the asset via the use of a "geofence", or an area defined by gps coordinates, which allows the wireless device to transmit a message when entering or leaving. If the geofence locations loaded into the firmware of the wireless device on the refrigeration unit correspond to the collection of designated locations, then wireless transmissions occur whenever any particular unit in a fleet entered or left a designated location. This embodiment of the invention involves the predetermination that a shipment order is "active and initiated", and that a designated location is available as a geofence on the asset, and the designated location is defined on the shipment order as a routing junction, which might be linked to a previous designated location and collectively called a segment, and the shipment order identifies a PSRP responsible for the shipment through the duration of the segment, then the trip segment can be automatically traced in the programming system by the wireless device. Should an irregularity occur during the segment journey, such as a refrigeration alarm condition or an inadvertent refrigeration shutdown, then a wireless notification is sent to the PSRP for retrieval by cell phone or pager or personal computer notifying the PSRP to take care of the irregular condition.

According to the figures, once an "active and initiated" shipment leaves shipment origin in the prescribed operational state (reefer on, set point correct), then responsibility for the shipment is assigned to PSRP 1. Once this shipment physically arrives into Designated Location 1 without any irregularities, then the segment is terminated in the programming system, and responsibility for the shipment is transferred to the management of Designated Location 1. Upon leaving Designated Location 1 in an "active and initiated" state, then the shipment segment responsibility is assigned to PSRP2, who is identified on the shipment order. This process continues, until Designated Locations for the shipments are exhausted and all the shipment segments except the last one are terminated.

The embodiments of the invention provide the completion or termination of individual trip segments of a route for an overall shipment plan. The embodiments of the invention provide more enhanced logic when the refrigerated transport unit travels outside of the final designated location to the delivery location. At this point, the system knows from the matching of the trip segments to wireless status information that the shipment is currently in the last (delivery) segment. At this point, the system searches for wireless information that is indicative of a shipment delivery. For instance, should the wireless monitoring device on the asset detect that a tractor has become disconnected from the trailer in the final segment of a journey, then this would be an indication that the reefer unit is close to destination, as it is dropped off in a yard. Subsequent messages, such as "door open" would be indicative of an unload event. Further, turning off the refrigeration unit locally would be the indication of the final destination. A dwell time exceeding a prescribed limit after the refrigeration unit is turned off may be a factor in the automatic declaration that the shipment has arrived at destination. Finally, the geographic return of the reefer to any designated location with the reefer unit off would designate a certainty that the delivery has been automatically made. In this manner, users may designate the standard sequence of refrigeration unit specific events transmitted via wireless communications, which indicate that a shipment has arrived at destination. Once these series of events is received in the last segment, the final trip segment may be terminated and the overall shipment dispatch work order may be terminated. In this manner, the shipment dispatch work order is not available in the future for newly "active" refrigerated shipments.

With the proliferation of an entire fleet of refrigeration units within the context of this matching and segment termination methodology, refrigerated trailers that are not in use may be evaluated for their dwell time, suitability for use, fuel levels and future use plans. If all trailers are to be associated with shipments during use, then wireless management of unassociated trailers offers significant potential for operational efficiency. Thus, the collection of unassociated trailers can be categorized in an inventory system for management to assign (i.e. working properly and available for shipment, requires maintenance, requires fuel, requires pre-trip, requires preventative maintenance).

Further, exceptions to the trip activity may be evaluated to assure that operational efficiencies are maintained. For instance, matching shipment orders to refrigeration activity with automatic forced termination of shipments based on reefer conditional information leads to the ability to examine refrigeration units that remain on for long periods of time at customers' facilities.

Shipment dispatch orders for refrigerated containers cover broad regions, often including a land segment, a sea segment and another land segment of the journey. Because gensets are used in land segments of a specific region, this method permits the association of shipment dispatch orders with genset-mounted wireless devices while the refrigerated container is in the land segment of that specific region. Inventive techniques are necessary, because the shipment dispatch order may generally be created long in advance of the land segment of the journey in the region of interest, and the genset is "transient equipment", which will interface to numerous refrigerated containers and be responsible for numerous shipments over time.

This method utilizes a gps wireless device on a refrigeration genset, to (1) retrieve and transmit a refrigerated container identification number and (2) match that identification number with a shipment document or work order for the refrigerated container. In this manner, a shipment order for a refrigerated container, which contains such relevant information as (1) freight planning information for a commodity, (2) the prescribed temperature control conditions for the shipment, (3) the origin and destination and delivery points for the shipment, (4) the parties responsible for the shipment and (5) the routing and interchange points of the shipment, may be matched to the wireless device on the refrigeration genset while it is attached to the refrigerated container. Additional freight shipment information may be derived by combining the real-time wireless data transmitted by the genset, the container and the shipment information together, leading to optimization of the shipment and improvement of the reliability via the constant monitoring of the condition of the cargo during the shipment. This optimization of the reefer container, genset and shipment order is the subject of another patent application.

A genset is attached to a specific refrigerated container, when the refrigerated container is transported on the land segment of its journey. The genset temporarily provides fuel and electrical energy to that specific container, and the genset will be used with different refrigerated containers containing different commodities in the future. This embodiment of the invention furnishes an electronics systems deployed on the genset, that monitors its location and condition, which interfaces to the microprocessor on the refrigerated container via a power line modem and the genset-container power cord or a wireless device. Via this interface, when the refrigerated container is turned on, the wireless device may read technical data from the refrigerated container to contain refrigeration data (temperature, operating states) and the refrigerated container number. If the genset is able to logically make the connection to the refrigerated container, then it can transmit the container number and other relevant information via wireless communications.

The embodiments utilize the refrigerated container number derived from such a wireless device via wireless transmission to a database. The wireless information contains the serial number of the wireless device on the genset, and by association, the genset number. Therefore, while the genset is attached to the refrigerated container, the wireless device provides an association of the refrigerated container number to the genset, while they are temporarily attached to one another during the shipment. In this manner, the wireless device on the genset identifies a transient association to the container only during a relevant shipment segment of the journey.

Often, because the container has been powered by electrical energy on a ship or on shore, the shipment dispatch is created in well in advance of when the genset is attached to the container and turned on. The shipment dispatch therefore does not contain the genset number. The embodiments of the invention provide a procedure which collects all of the container shipment dispatches for the region in a database. Once the genset wireless device identifies the refrigerated container number to the database, a matching procedure is performed that identifies the relevant shipment number by screening through the complete collection of shipment orders for the entire container fleet. In this manner, an association is made between the following elements in the following sequence:

(5) Genset Wireless Device Serial Number/Genset Number
(6) Refrigerated Container Number
(7) Shipment Dispatch or Order Document Number
(8) Relevant Shipment Planning Data (Commodity, temperature set point, origin, destination, route).

By screening the entire lot of shipment orders for a fleet of refrigerated containers, it is feasible to identify the refrigerated container order number, via the container number, directly to the container number transmitted by the wireless device. In this manner, the database permits an association from the wireless device serial number, the genset number, the refrigerated container ID number and the shipment number, along with all of its associated order information. When this happens, the genset/container/shipment dispatch is determined to be in an "active and initiated" state.

In a second embodiment of the invention, a wireless transmission of a refrigerated container ID may be created prior to the creation of the appropriate shipment dispatch. Therefore, the container ID must be held in the database in an "active, but not initiated shipment" state. This is necessary as the genset and refrigerated container are running, but they must be placed in a holding pattern until the necessary shipment document is available.

Because of the disparate timing of the creation of shipment order and the genset/container wireless transmission, container shipments must be terminated in the region. This is necessary to prevent the genset/container wireless transmission to be associated with a previous shipment dispatch order when the new order has yet to be created. The logic of the embodiments of the invention prohibits a match from occurring on a terminated shipment. Because genset/container/shipment dispatches are required to be terminated, it is also necessary to create an "active and initiated" state, when a proper match is achieved. "Active" refers to the condition that the genset/container association has been achieved in the database, and "Initiated" means that the second association with the shipment dispatch has been achieved.

Thus, each genset/container ID newly associated in the database must be assigned an "active, but not initiated" state prior to the time a match with the shipment number is made in the database. If the genset/container id association is active for a long enough period of time, it is assumed that the genset/container pair is either (1) being used for some purpose other than a shipment, or (2) the subject of a shipment document error, and the "active but not initiated" state transitions to a "no order" state.

If a shipment order is received for the region, the shipment is presumed to be in an "initiated" state. If, over time, no genset/container association is available, it is a possibility that (1) the wireless device is inoperable, (2) the refrigerated container is not configured with the proper equipment to allow the wireless device to read its information or (3) another error has occurred. This requires that the shipment order be over written by a more recent shipment order, which is then declared "initiated". The older shipment order must be ignored therefore for the purpose of matching and thus, genset/container association matches with shipments in the "initiated" state.

The embodiments of the invention match the operational activity of attaching a genset to a refrigerated container with a shipment dispatch, which contains the refrigerated container number. The figures identify the conditions that must be handled by the logic of the database. In order that the database prevent matching errors, the rules need to be established in the database. Although all shipment dispatches in time are available in the database, these need to be screened to determine "initiated" states, which are the only shipments to be matched. Shipments need to be "terminated" so those are not used when genset/containers deliver their wireless messages prior to initiation of the new relevant shipments.

The embodiments automatically disassociate the genset/container/shipment dispatch order upon completion of the shipment. In this manner, the wireless device must then be receptive to identify another container number and dispatch order (as the genset is moved to another container requiring transport), and other dispatch orders must be responsive to match to other gensets. Logic associated with the termination of shipment dispatches is the subject of another patent application.

Thus, in the database, it is feasible to identify the operating conditions of the refrigeration system, along with its operating condition, temperatures, locations, fuel levels, etc. with the shipment planning parameters contained in the shipment order, containing the commodity (i.e. frozen meat, fresh broccoli, etc), its shipment origin, its routing, the parties responsible for the shipment and its destination. Thus, an association of the complete shipment plan is associated with wireless derived operational information for the entire course of the shipment.

Shipment dispatch orders for refrigerated containers cover broad regions, often including a land segment, a sea segment and another land segment of the journey. Because gensets are used in land segments of a specific region, this method permits the association of shipment dispatch orders with genset-mounted wireless devices while the refrigerated container is in the land segment of that specific region. Inventive techniques are necessary, because the shipment dispatch order may generally be created long in advance of the land segment of the journey in the region of interest, and the genset is "transient equipment", which will interface to numerous refrigerated containers and be responsible for numerous shipments over time.

This method utilizes a gps wireless device on a refrigeration genset, to (1) retrieve and transmit a refrigerated container identification number and (2) match that identification number with a shipment document or work order for the refrigerated container. In this manner, a shipment order for a refrigerated container, which contains such relevant information as (1) freight planning information for a commodity, (2) the prescribed temperature control conditions for the shipment, (3) the origin and destination and delivery points for the shipment, (4) the parties responsible for the shipment and (5) the routing and interchange points of the shipment, may be matched to the wireless device on the refrigeration genset while it is attached to the refrigerated container. Additional freight shipment information may be derived by combining the real-time wireless data transmitted by the genset, the container and the shipment information together, leading to optimization of the shipment and improvement of the reliability via the constant monitoring of the condition of the cargo during the shipment. This optimization of the reefer container, genset and shipment order is the subject of another patent application. The process is illustrated in the figures.

The instruction in the database for a segment is deactivated upon completion of the segment. Must terminate each segment to make sure it does not come up again, i.e. is not available for another match.

Each genset is off when it reaches end of a segment (or by mistake). If destination is reached, then the turn-off is ok. If the turn-off is accidental, notification is sent automatically to turn genset back on. The assigning statement for each segment is removed from the database upon completion of that segment.

Each shipment or route is composed of a number of segments or segments. For each trip the container is matched and the route set for that segment. Releasing the database instruction at the completion of each segment assures that it will not be accidentally repeated.

In general two types of gensets are used. The more expensive is a flexible "clip-on" that is attached to the container and removed on a ship. The less expensive is underslung under the chassis of a truck. While in the present While embodiments of the invention have been described in detail, it will be evident to those skilled in the art that the embodiments of the invention may be embodied otherwise without departing from its spirit and scope.

What is claimed is:

1. A method for controlling refrigerated shipping containers based on container shipping orders comprising:
   providing a first, second, and third refrigerated container, each having contents and identifiable by a container ID;
   providing a first, second, and third genset, each comprising a wireless device;
   attaching the first refrigerated container to the first genset, the second refrigerated container to the second genset, and the third refrigerated container to the third genset in each case by a genset-container power cord connection;
   receiving, by the first, second, and third genset, the container ID of the first, second, and third refrigerated container through the genset-container power cord;
   receiving, by an operations center from one or more customers, a first, second, and third work order, each respectively associated with the first, second, and third refrigerated container, and entering the first, second, and third work orders into a database;
   receiving, by the operations center from the wireless device on the gensets attached to the first, second, and third refrigerated container, a first, second, and third message associated respectively with the first, second, and third refrigerated container, and each having, respectively, the first, second, and third container ID, and applying the first, second, and third message to the database;
   performing continuously, in real-time, a first operation, a second operation, and a third operation;
   wherein:
      in the first operation:
         looking, in the database, for containers that are unlocked and do not have a trip segment locked to the container and finding the first container;
         matching the found first container to the first work order via the container ID; and
         locking the first container to a first trip segment and transitioning the first container to a trip initiation state in the database;

in the second operation:
    looking, in the database, for containers that are in a trip initiation state and finding the second container;
    confirming details that the second container is locked to a second trip segment;
    confirming a location of the second container provided in the second message is a same location as an origin location contained within the second work order; and
    if both the details and the location are confirmed, then transitioning the second container to a trip initiation confirmed state in the database;
in the third operation:
    looking, in the database, for containers that are in a trip initiation confirmed state and finding the third container;
    confirming details that the third container is locked to and initiated with a third trip segment;
    confirming a location of the third container provided in the third message is a same location as a destination location contained within the third work order; and
    if both the details and the location are confirmed, then unlocking the third container from the third trip segment and transitioning the third container to an unlocked and available state in the database.

2. The method of claim 1, wherein, in the second operation:
    if the location of the second container is not confirmed, then transitioning the second container to an unlocked and available state in the database.

3. The method of claim 1, further comprising:
    providing a genset comprising a power generator and a wireless communications interface and having a genset ID;
    attaching the genset with the first container;
    temporarily associating the genset ID with the first container ID; and
    communicating to the database, via the wireless communications interface, at least one of the genset ID and the first container ID when the genset is attached with the first container.

4. The method of claim 1, wherein the first, second, and third work orders each comprise:
    an origin;
    a destination;
    routes;
    a responsible entity indicator;
    and container content indicia.

5. A method as in claim 1, wherein the message includes the transmission of a container number of a container connected to a genset, a genset ID, a shipment reference number, and a GPS location.

6. The method as in claim 1, wherein the first, second, and third container IDs are each received by the first, second, and third genset through a microprocessor in each of the first, second, and third refrigerated container.

* * * * *